4 Sheets--Sheet 1.

O. P. & L. W. BRIGGS.
Machines for Threading Nuts.

No. 137,757. Patented April 15, 1873.

WITNESSES.
William Edgar
Wm Cochrane

INVENTORS.
Orlando P. Briggs
Lewis W. Briggs
by Sherburne & Co.,
Attorneys.

AM. PHOTO-LITHOGRAPHIC CO. N.Y. (OSBORNE'S PROCESS.)

4 Sheets--Sheet 2.
O. P. & L. W. BRIGGS.
Machines for Threading Nuts.
No. 137,757. Patented April 15, 1873.
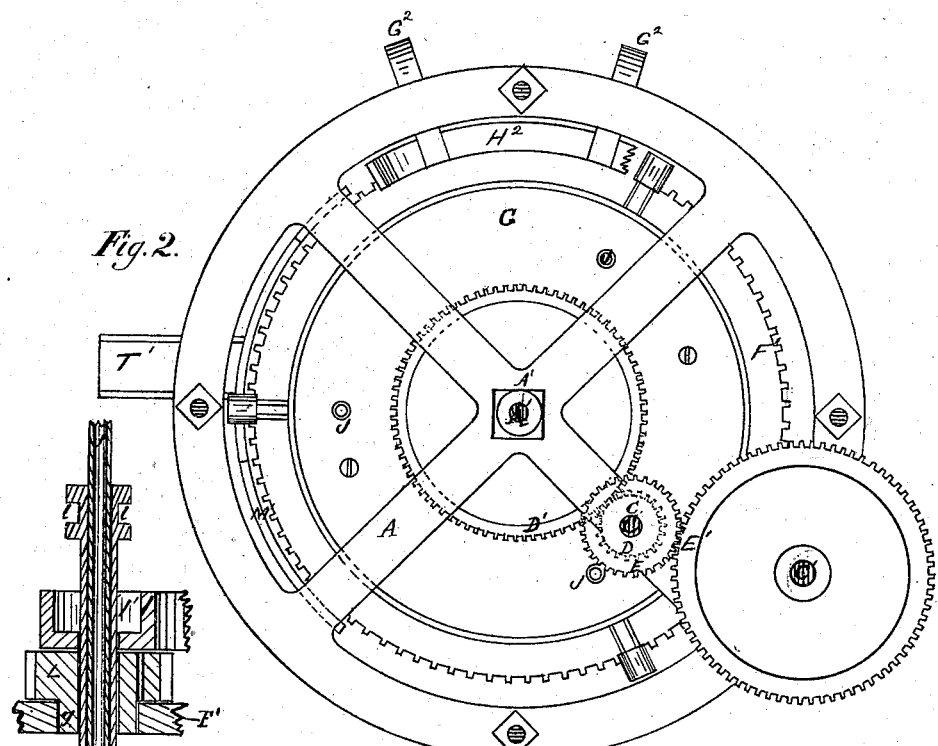
Fig. 2.
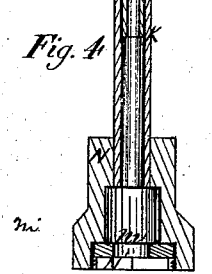
Fig. 4. Fig. 3. 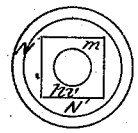 Fig. 5.
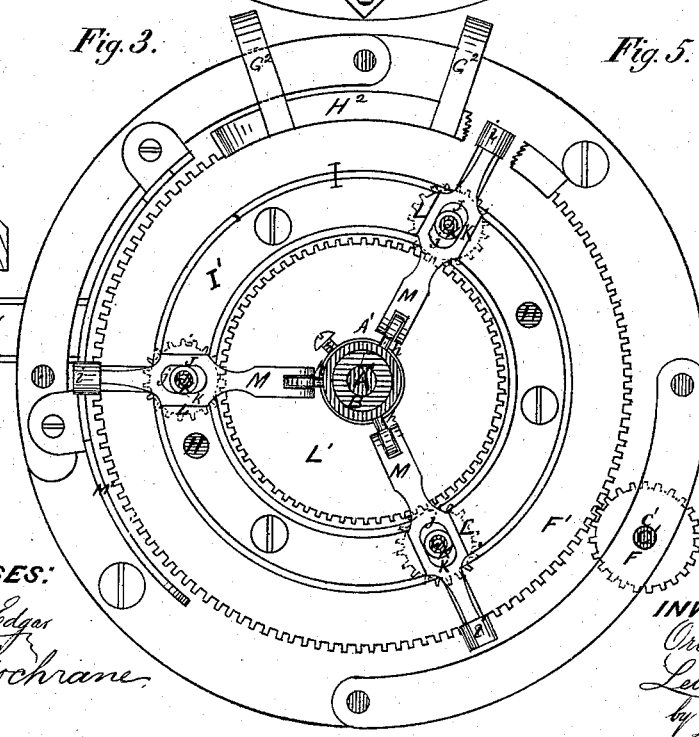
WITNESSES:
William Edgar
Wm Cochrane
INVENTORS
Orlando P. Briggs
Lewis W. Briggs
by Sherburne & Co.
Attorneys.
AM. PHOTO-LITHOGRAPHIC CO. N.Y. (OSBORNE'S PROCESS.)

4 Sheets--Sheet 3.
O. P. & L. W. BRIGGS.
Machines for Threading Nuts.
No. 137,757. Patented April 15, 1873.
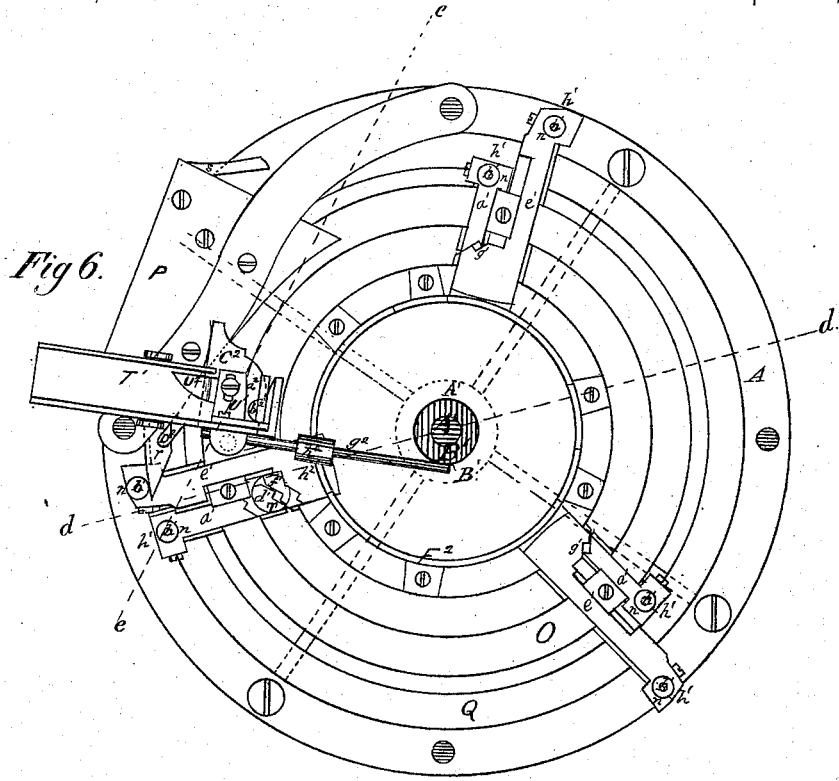
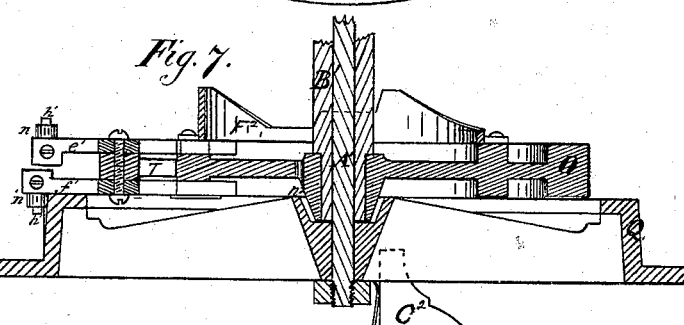
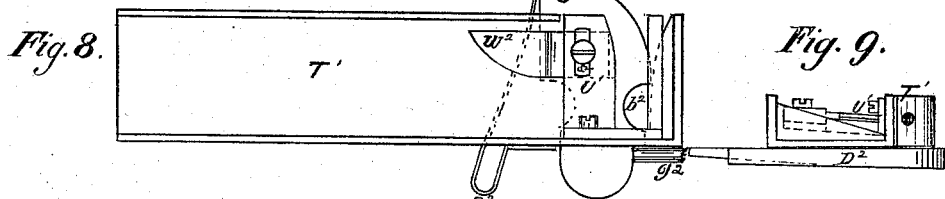
WITNESSES:
William Edgar
Wm Cochrane
INVENTORS:
Orlando P. Briggs
Lewis W. Briggs
By Sherburne & Co.,
Attorneys.

4 Sheets--Sheet 4.

O. P. & L. W. BRIGGS.
Machines for Threading Nuts.

No. 137,757. Patented April 15, 1873.

WITNESSES:
William Edgar
Wm Cochrane

INVENTORS:
Orlando P. Briggs
Lewis W. Briggs
By Sherburne & Co.
Attorneys.

UNITED STATES PATENT OFFICE.

ORLANDO P. BRIGGS AND LEWIS W. BRIGGS, OF CHICAGO, ILLINOIS; SAID ORLANDO P. BRIGGS ASSIGNOR TO SAID LEWIS W. BRIGGS.

IMPROVEMENT IN MACHINES FOR THREADING NUTS.

Specification forming part of Letters Patent No. 137,757, dated April 15, 1873; application filed December 5, 1872.

*To all whom it may concern:*

Be it known that we, ORLANDO P. BRIGGS and LEWIS W. BRIGGS, of Chicago, in the county of Cook and State of Illinois, have invented certain new and useful Improvements in Nut-Cutting Machines; and we do hereby declare the following to be a full, clear, and exact description thereof, which will enable others skilled in the art to which our invention appertains to make and use the same, reference being had to the accompanying drawing forming part of this specification, in which—

Figure 1:
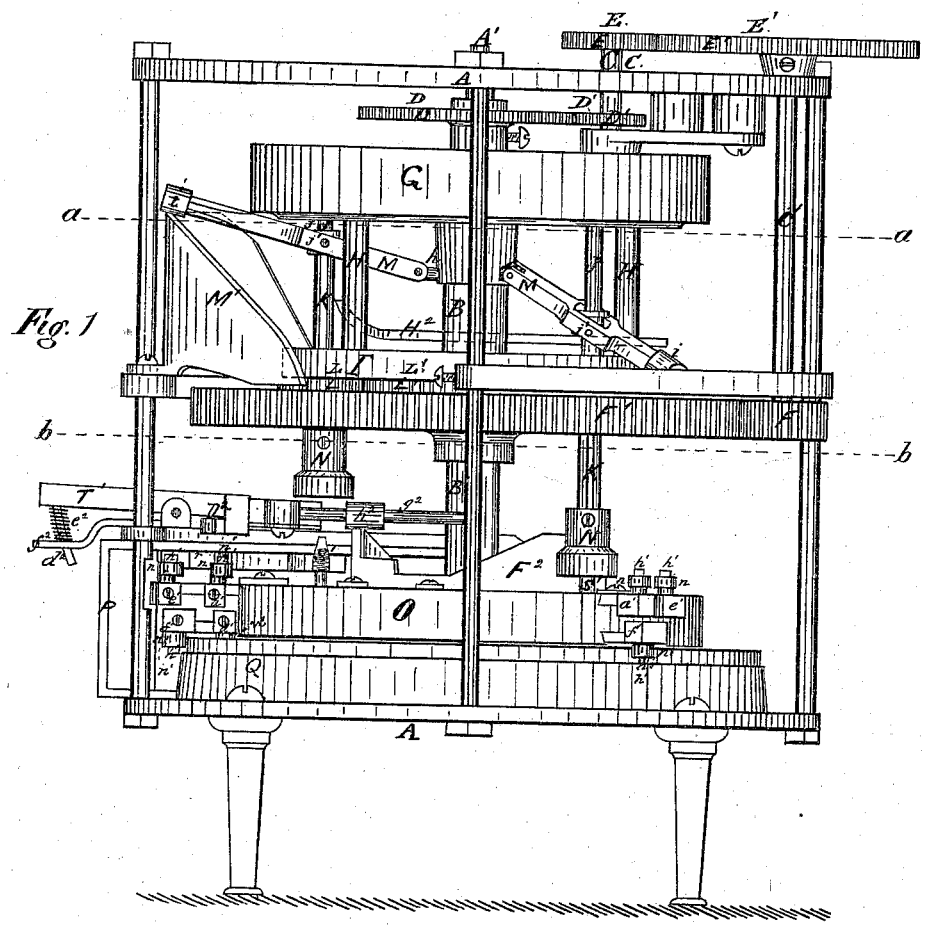
Figure 10:
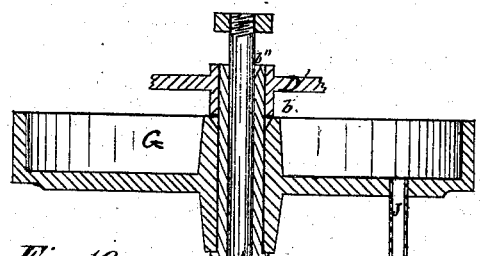
Figure 11:
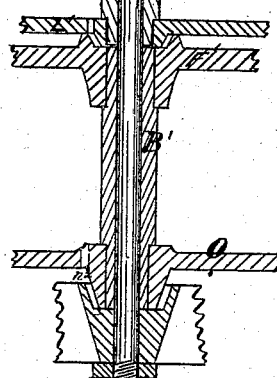
Figure 12:
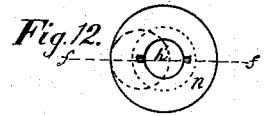

Figure 1, Sheet 1, is a side elevation of a nut-cutting machine embodying our improvements. Fig. 2, Sheet 2, is a general plan or top view of the same. Fig. 3, Sheet 2, is a cross-section or plan of the respective parts between the lines $a\ a$ and $b\ b$ drawn across Fig. 1. Fig. 4, Sheet 2, is an enlarged vertical central section of the shaft and mandrel turning the nut, and the parts connected therewith, showing the manner of lubricating the nut while in process of being cut. Fig. 5, Sheet 2, is an enlarged end view of the mandrel, detached. Fig. 6, Sheet 3, is a cross-section or plan view, showing the respective parts below the lines $d\ d$ drawn across Fig. 1. Fig. 7, Sheet 3, is a vertical central section taken on line $d\ d$ drawn across Fig. 6, showing the parts below the line $b\ b$ drawn across Fig. 1. Fig. 8, Sheet 3, is an enlarged top view of the receptacle holding the nut-blanks, showing the manner of depositing the same upon the tap; and Fig. 9, Sheet 3, is an end view of the same. Fig. 10, Sheet 4, is a detached vertical central section of the central shaft and parts connected therewith. Fig. 11, Sheet 4, is a top view of that portion of the base which is at the left hand of the line $e\ e$ drawn across Fig. 6, showing the cams operating the gripers holding the tap. Fig. 12, Sheet 4, is an enlarged top view of one of the anti-friction wheels that act against the cams for moving the gripers; and Fig. 13, Sheet 4, is a vertical central section of the same taken on the line $f\ f$ drawn across Fig. 12, showing the shape of the shaft carrying the same.

Similar letters of reference indicate like parts in the several figures of the drawing.

Our invention relates to a machine for cutting the thread in nut-blanks automatically, and consists in the improvements hereinafter set forth in the claim.

In the accompanying drawing, A represents the frame-work, which is substantially made of metal, as shown, and may be arranged in any suitable manner, or of any form that will receive the operating parts of the machine. A' is a vertical shaft, which is permanently secured within the center of the frame. Upon the shaft A' are mounted hollow shafts B and B', one above the other, which are so arranged as to freely rotate thereon. C is the main driving-shaft, which is situated in suitable boxes permanently attached to the frame. Attached to the lower extremity of this shaft is a gear-pinion, D', which engages a corresponding gear-wheel, D, mounted upon the upper end hollow shaft B. Firmly fixed upon the upper end of shaft C is a gear-pinion, E, which engages a corresponding gear-wheel, E', mounted upon the upper end of a vertical shaft, C, which shaft is secured in suitable boxes attached to the frame of the machine. Firmly secured upon the lower end of shaft C' is a gear-pinion, F, which engages a corresponding gear-wheel, F', mounted upon the upper end of shaft B'. Thus, as rotary motion is communicated to the main driving-shaft C, an opposite rotating motion is imparted to the shafts B and B'. Loosely mounted upon the upper end of shaft B is an oil-tank, G, a central section of which is shown in Fig. 10. Permanently attached to the lower surface of said tank are standards H, which extend downward and are firmly secured at their lower ends to an annular rim, I. This rim is provided upon its upper surface with an annular groove or channel, I', as shown in Fig. 4. The lower surface of said rim is provided with a series of lugs, which bear upon the upper surface of wheel F', and holds said rim and wheel a short distance apart. Screws are passed through these lugs, and enter the said wheel thus by means of the standards and screws. The rim and the tank are permanently attached to each other and wheel F' in such a manner as to revolve therewith.

J is a series of tubes, which are permanently attached to the lower surface of tank G, and extend downward to a point slightly above rim I. These tubes communicate with the interior of the tank, as shown in Fig. 10. Loosely mounted upon the respective tubes are primary shafts K, which extend downward through rim I and wheel F', as shown in Fig. 1. Secured upon each of said primary shafts, between rim I and wheel F', is a gear-pinion, L, which engages a large gear-wheel, L', permanently mounted on the lower end of shaft B. Thus, as shaft B is rotated by the rotation of the main driving-shaft C, an independent rotating movement is imparted to the primary shafts as the same are carried around jointly with and by the rotation of wheel F'. Said primary shafts are each provided with a longitudinal groove or key-seat, which receives a feathered key secured within the pinion, by which means these shafts are allowed a free and easy vertical movement as well as a rotary movement, which latter is done by the action of the large gear-wheel L'. The said pinions are each provided upon the lower surface with a hub, $g$, which passes downward through wheel F', thereby forming its bearings within the wheel, the object being to relieve the primary shaft of friction. Firmly fixed to the hub of the tank G is a series of lugs, $h$, to which are pivoted levers M. These levers extend outward slightly beyond the periphery of wheel F', and are each provided at their outer ends with an anti-friction wheel, $i$, which can freely revolve thereon. The said levers are each provided at a point near the center with a mortise, $j$, through which the upper end of the primary shafts pass, and within which the said shafts are secured by means of the pin-pivot, $j$, which takes into a groove, $l$, formed around the shaft near its end. M' is a cam, which is permanently attached to the frame near the periphery of the wheel F'. This cam is situated on the side of the machine immediately under wheel $i$ of the levers M, as the same are carried around with and by the rotation of the wheel F', by which cam a vertical movement is imparted to the primary shafts. Firmly secured upon the lower end of each primary shaft is a mandrel, N, the lower end of which is made hollow, as shown in Fig. 4. The lower portions of said mandrels are screw-threaded internally, and within which is secured a disk, N'. This disk is provided at its center with a rectangular mortise adapted to receive the nut-blank, and can be readily removed when desired, the object being to allow the same to be changed when blanks of different sizes are to be cut. Firmly secured upon the lower end of shaft B' is a disk, O, which revolves with said shaft and jointly with wheel F'. The said disk is provided within its upper and lower sides with a series of radial grooves or channels extending from its periphery in toward its center. Within these grooves or channels is secured a series of gripers, $a'$ $e'$ and $d'$ $f'$, which are so arranged as to admit of a free and easy alternate movement from or toward the center of the disk. These gripers form between them a mortise, $g'$, adapted to receive the shank of the tap when the parts $a'$ $e'$ are moved outward from the center, and the parts $d'$ $f'$ are moved inward toward the center of the disk. These mortises are so arranged as to bring the taps in succession in the same vertical plane with the center of the mandrel, as shown in Fig. 1. Firmly secured within the outer end of each part of the gripers is a vertical shaft, $h'$, on which is mounted eccentrically an anti-friction wheel, $n$. Permanently attached to the frame of the machine is a horizontal metal plate, P, as shown in Fig. 6, and firmly secured to a lower flange of this plate is a series of lugs, $r$ $s$ $t$, which are so arranged as to form grooves $u$ $v$, through which the wheels $n$ of the gripers pass as the disk O is rotated. The forward end of lug $r$ is so shaped as to form two inclines, which pass between the wheels $n$ as the same are brought in contact therewith by the rotation of the disk O. The base of the frame is provided with an annular rim, Q, which extends upward to a point near the lower surface of disk O, as shown in Figs. 1 and 7. This rim is so arranged as to pass between the wheels $n^1$ of the lower gripers $d^1 f^1$, and against which the said wheels revolve, by which means the gripers are held firmly in a closed position. This rim is provided at a point under lug $r$, and upon its outer and inner sides with inclined recesses, within which is fitted V-shaped pieces of metal, so arranged as to form cam-grooves R and R$^1$, through which wheels $n^1$ pass, as shown by dotted lines in Fig. 11. The arrangement of these grooves is such as to open the gripers $d^1 f^1$, as the gripers $a^1 e^1$ are closed by the action of lug $r$. S$^1$ is the tap, which is alternately held within mortises $g^1$ of the gripers, disk O being provided with apertures T, through which the tap passes. The horizontal diameter of these apertures T is such as to allow the nut to loosely pass through the same, the object being to allow the nut by its gravity to release itself from the tap when the lower gripers are opened after the thread has been cut. T is the receptacle, within which the nut-blanks are placed. This receptacle is pivoted to the main frame in such a manner as to admit of a free-and-easy tilting movement, and extends inward toward the center of the machine to a point immediately over the tap. The lower inside surface or bottom of the outer end of this receptacle is formed at an obtuse angle to its sides, and is gradually turned until brought to a right angle to its sides at its inner end, as shown by the dotted line in Fig. 9; the object being to bring the edge of the nut-blank against the right-hand side of the receptacle, thereby insuring each to move in the same position, and to bring the blank to a level position, where it is deposited over the tap. U$^1$ is a metal plate, which is attached to one of the sides of the receptacle, and extends transversely across the same, under which the nut-blanks pass. This plate is so arranged as to admit of being adjusted vertically, (the object being to receive blanks of different thicknesses,) and is provided with a slot, $a^2$. $W^2$ is an adjustable stop-plate, which is secured to the lower side of the plate $U^1$, and is so arranged as to admit of being adjusted laterally toward or from the center of the receptacle, the object of which is to receive blanks of different widths; also to guide the same in a line to the tap, and prevent the succeeding blank from being moved forward as the one deposited upon the tap is moved from the receptacle by rotation of the disk O. $C^2$ is a flat horizontal metal plate, which is pivoted to the lower surface of the receptacle, and is so arranged as to be immediately under plate $U^1$. The blank is supported upon the plate $C^2$. This plate is provided with a semi-annular niche, $b^2$, formed in its edge, through which the tap passes. Firmly secured to the side of the receptacle is a spring, D, which passes under the same to and against the edge of plate $C^2$, as shown in Fig. 8. This spring is so arranged as to yield and allow the plate to move slightly upon its pivot, when the tap is brought against the edge of the niche, thereby allowing the tap to pass from said niche, as the tap is carried around by the rotation of the disk O, and the spring forces said plate back to its normal position as the tap is released therefrom, thus securing the adjacent blank in a proper position to be deposited upon the following tap. Permanently attached to the outer end of the receptacle is an arm, $d^2$, upon and around which is secured a coiled spring, $e^2$. The upper end of this spring bears against the lower surface of the receptacle, and is supported at its lower end upon a flat metal bar, $f^2$, which is firmly attached to the frame; this spring tilts the outer end of the receptacle upward, and thereby holds the same in an inclined position. Firmly secured to the inner end of the receptacle is a horizontal shaft, $g^2$, which extends inward to the center of the machine, and upon this shaft is mounted a transverse wheel, $h^2$, which rests upon an annular rim, $F^2$, secured to the upper surface of disk O. The upper edge of this rim is provided with a series of cams, as shown in Figs. 1 and 7. These cams are so graduated as to raise the inner end of the receptacle at the proper time to allow the tap to pass under the same, and to allow wheel $h^2$ to pass from the cam as the tap has reached the center of the nut-blank, by which means the inner end of the receptacle is forced downward by the action of spring $e^2$ thereby depositing the blank upon the tap preparatory to its being cut.

Firmly attached to the frame of the machine are springs $G^2$, to which is affixed an arc-piece of metal, $H^2$, under which wheels $i$ of levers M pass as said levers are carried around by the rotation of wheel $F^1$. The object of these springs and arc $H^2$ is to force mandrels N downward to cause the mortises to engage the nut-blanks as wheels $i$ have passed from cam $M^1$, and to hold the said mandrels firmly upon the blank during the process of cutting the thread therein by the rotation of the primary shafts.

Figure 13:

It will be observed by reference to Fig. 13 of the drawing that shaft $h^1$ is made in the form of an eccentric; the object being to enable the position of the said shaft to be changed, thereby changing the position of wheels $n$, and, consequently, the respective gripers, increasing or decreasing the size of the space or opening when larger or smaller taps for cutting blanks of different sizes are used.

The upper end of shaft B is provided with a cavity, $l''$, communicating with shaft $A'$, as shown in Fig. 10. Within this cavity the oil is placed for lubricating the respective shafts $A'$ and B. A like cavity, $l^3$, is formed in the upper end of the hub of tank G, within which is placed the oil for lubricating said hub upon shaft B. The upper surface of the hub of wheel F is also provided with a recess or cavity, within which the hub of wheel $L^1$ is loosely fitted, as shown in Fig. 10. This cavity is such as to form an oil-cup, within which oil is placed for lubricating shaft $B^1$; also for securing the proper lubrication of the ends of said shaft and shaft B. A like cavity, $n^2$, is formed in the hub or center of the base of the frame, within which the hub of disk O is loosely fitted, forming an oil-cup, within which oil is placed for lubricating the lower bearing of shaft $B^1$. An aperture is formed through the hub of wheel $L^1$ and wheel $F^1$, through which the oil is introduced into their respective cavities.

We provide the lower extremity of the mandrels with a washer, $m^1$, arranged between the upper surface of disk $N^1$ and the shoulder of the mandrel, as shown in Fig. 4. This washer can be readily removed to change the same when taps for cutting blanks of different sizes are used.

The channel in rim I is provided as an oil-chamber for lubricating the pinions upon the primary shafts.

For imparting the requisite motion to the machine we usually provide the upper end of the main driving-shaft C with a stock of pulleys, (not shown in drawing,) around which is passed a belt communicating with a suitable motor; but we do not wish to confine ourselves strictly to this method, for any other known arrangement of belts or geared wheels that will produce the same result may be substituted.

The operation of our machine is as follows: The operator places the nut-blanks in the receptacle $T^1$, and, as motion is imparted to the main driving-shaft C, pinion E gears with wheel $E^1$ of shaft $C^1$, imparting thereto a rotary motion, which is communicated to wheel $F^1$ of shaft $B^1$ and disk O by means of pinion F, causing said wheel, disk, and tank G to revolve in one and the same direction. Pinion D gears with wheel $D^1$ of shaft B, which imparts thereto an opposite rotary motion, which is communicated to the primary shaft K and turns them in an opposite direction, imparting to said primary shafts an independent rotary motion, as the same are carried around by the rotation of wheel $F^1$. The cam of rim $F^2$ is brought in contact with and under wheel $h^2$ of shaft $g^2$, imparting to the receptacle an upward-tilting movement at its inner end and at the proper time and so as to allow the tap to pass under the same. Simultaneously with said upward movement of the receptacle, wheels $i$ of levers M are brought in contact with cam $M^1$, imparting to the primary shafts N an upward movement, allowing mandrels N to pass over the receptacle. As disk O has reached the proper point to bring the tap immediately under the aperture in the nut, blank-wheel $h^2$ is now relieved from the cam or rim $F^2$, and the inner end of the receptacle is forced downward by the action of spring $e^2$, thus depositing the nut-blank upon the tap. By a continuous movement of the disk O the tap strikes and turns the plate $C^2$, and is removed from the receptacle, when wheels $i$ pass from cam $M^1$ under arc $H^2$, forcing mandrels N downward, and the nut-blank enters the mortise in disk $N^1$. The primary shafts then rotate and impart to the nut-blanks they hold upon the tap a rotating movement. By a further rotating movement of the disk O the thread is cut and finished in the blanks by the continuous motion of the primary shafts, and finally, the nut by its gravity passes over the shoulders of the tap and falls through an aperture, T, in the disk and upon the gripers $d^1 f^1$, the gripers $a^1 e^1$ being opened to admit of the same. As the disk O has made an entire revolution, wheels $n$ of gripers $a^1 e^1$ are brought in contact with lug $r$, thereby closing the gripers against the tap above the nut, and wheels $n^1$ of gripers $d^1 f^1$ are brought into grooves R and $R^1$, thereby opening the lower gripers, and the nut is discharged from the machine. Simultaneously with the discharging of the nut from the machine, the said wheels $n^1$ are disengaged from the grooves, closing the gripers $d^1 f^1$ against the tap, and the wheels $n$ of gripers $a^1 e^1$ are passed through the grooves U V, formed by the lugs $r\ s\ t$ opening the same preparatory to a repeated action of the machine.

For lubricating the nut while in process of being cut, we deposit a quantity of oil in tank G, which passes downward through tubes J and the primary shafts K to and upon the tap, thereby properly lubricating the same. The oil after passing the tap is discharged into a suitable receptacle (not shown) which is arranged under the machine, and is conveyed back to tank G by means of a suitable pump.

We do not wish to confine ourselves exclusively to holding the taps by the lower series of gripers during the process of cutting the nut, as the upper series may be so arranged as to perform the same function independent of, or jointly with, the lower series.

We do not claim, in this application, the gripers for automatically holding the tap, as herein specified, the same being made the subject-matter of a separate application; but What we do claim, is—

1. The receptacle $T^1$, arranged to automatically place the nut-blank upon the tap, as described, in combination with disk O and cam-rim $F^2$, as specified.

2. The combination, with disk O having grooves R and $R^1$, lugs $r$, $s$, and $t$, of the gripers $a^1 e^1$ and $d^1 f^1$, arranged to seize and release the tap, as specified.

3. The series of revolving mandrels N, each provided with the adjustable washer $m^1$ and disk $N^1$, adapted to receive and turn the nut-blank, as described.

4. In combination with said mandrels, the primary shafts K and the gear-wheels to rotate said shafts, the levers M and cam $M^1$ for automatically elevating said mandrels to receive the nut-blank, as specified.

5. In combination with the subject-matter of the third claim, the springs $G^2$ and arc $H^2$, for depressing the mandrels upon the nut-blank, as described.

6. In combination with the gripers $a^1 e^1$ and $d^1 f^1$, the eccentric shafts $h^1$ carrying the wheels $n\ n^1$, for graduating the throw of the gripers, as described.

7. The revolving disk O, carrying the series of thread-cutting taps, in combination with the revolving mandrels and mechanism to rotate the latter, as specified.

8. In combination with the subject-matter of the seventh claim, the tank G, tubes J, primary reciprocating and rotating shafts K, and shaft $A^1$, as specified.

ORLANDO P. BRIGGS.
LEWIS W. BRIGGS.

Witnesses:
WILLIAM EDGAR,
WM. COCHRANE.